US006647272B1

(12) United States Patent
Asikainen

(10) Patent No.: US 6,647,272 B1
(45) Date of Patent: Nov. 11, 2003

(54) APPARATUS, AND ASSOCIATED METHOD, FOR AUTOMATICALLY NOTIFYING A MOBILE STATION OF OCCURRENCE OF A TRIGGERING EVENT

(75) Inventor: Jussi Asikainen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/444,330

(22) Filed: Nov. 19, 1999

(51) Int. Cl.[7] ................................................. H04Q 7/20
(52) U.S. Cl. ...................... 455/466; 455/406; 455/413; 455/414; 455/566; 379/88.12; 379/67.1; 704/270
(58) Field of Search ................................. 455/466, 414, 455/566, 406, 407, 458, 412, 408, 403, 413, 404; 705/26, 21; 704/270, 274; 379/88.12, 68, 67.1

(56) References Cited

U.S. PATENT DOCUMENTS

| 5,644,627 A | * | 7/1997 | Segal et al. ............... 379/88.09 |
| 5,802,166 A | * | 9/1998 | Garcia et al. ................ 379/372 |
| 5,933,488 A | * | 8/1999 | Marcus et al. .......... 379/217.01 |
| 6,195,542 B1 | * | 2/2001 | Griffith ....................... 455/406 |
| 6,272,347 B1 | * | 8/2001 | Griffith et al. ............... 455/445 |
| 6,311,042 B1 | * | 10/2001 | DeSchrijver .................. 455/66 |
| 6,324,394 B1 | * | 11/2001 | Vazvan ........................ 455/406 |
| 6,330,550 B1 | * | 12/2001 | Brisebois et al. .............. 705/75 |
| 6,356,752 B1 | * | 3/2002 | Griffith ....................... 455/406 |
| 6,389,276 B1 | * | 5/2002 | Brilla et al. ................. 455/413 |
| 6,430,279 B2 | * | 8/2002 | Sawatzki et al. ....... 379/144.01 |
| 6,493,430 B2 | * | 12/2002 | Leuca et al. ............. 379/88.12 |
| 6,529,723 B1 | * | 3/2003 | Bentley ....................... 455/405 |
| 6,542,868 B1 | * | 4/2003 | Badt et al. ................... 704/270 |

FOREIGN PATENT DOCUMENTS

| WO | WO 97/41654 | * 11/1997 | ............ H04H/1/00 |
| WO | PCT/US98/01391 | 8/1998 | |
| WO | WO 99/14711 | 3/1999 | |

* cited by examiner

*Primary Examiner*—Nguyen T. Vo
*Assistant Examiner*—Khawar Iqbal

(57) ABSTRACT

Apparatus, and an associated method, automatically notifies a mobile station operable in a radio communication system of the occurrence of a triggering event. Responsive thereto, the mobile station generates an audible alert to alert a user of the mobile station of the triggering event. When implemented at a bank service provider, a user of the mobile station is alerted automatically of the occurrence of, for example, a debit or a credit to the account of a user of the mobile station.

14 Claims, 3 Drawing Sheets

APPARATUS, AND ASSOCIATED METHOD, FOR AUTOMATICALLY NOTIFYING A MOBILE STATION OF OCCURRENCE OF A TRIGGERING EVENT

The present invention relates generally to a manner by which to alert a user of a mobile station, such as a WAP (wireless access protocol) cellular terminal of an occurrence of a triggering event at a remote location. More particularly, the present invention relates to apparatus, and an associated method, by which automatically to alert a user of the mobile station of the occurrence of a selected triggering event at a transaction service provider device. In one implementation, the user of the mobile station is automatically notified of a debit or credit to the user's bank account. Notification is made automatically, without need for the user to make inquiry to the transaction service provider device.

BACKGROUND OF THE INVENTION

Advancements in communication technologies have permitted the introduction of, and popularization of, new types of communication systems. As a result of such advancements, increasingly large amounts of data are permitted to be communicated at increasing thruput rates through the use of such new communication systems. And, as a result of such improvements, new types of communication services, requiring high data thruput rates, are possible.

Technological advancements have permitted the use of digital communication techniques to effectuate the communication of data during operation of various communication systems.

A radio communication system is exemplary of a type of communication system which has benefited from advancements in communication technologies and the use of digital communication techniques. In a radio communication system, at least a portion of a communication path formed during communications therein includes a radio link. Improved communication mobility is provided through the use of a radio communication system as communication channels defined upon the radio link in such a system are formed of radio channels and do not require wireline connections for their formation. The portion of the communication system which includes the radio link is sometimes referred to as the radio part of the communication system.

Digital communication techniques have been utilized in radio communication systems, thereby permitting improvement of communication capacities in such systems as well as permitting the implementation of new communication services. For instance, various cellular communication standards have been promulgated, and corresponding cellular systems have been implemented, which are predicated upon the use of digital communication techniques. The GSM (global system for mobile communications) cellular communication system is exemplary of a digital cellular communication system. The GSM, cellular communication system also provides for SMS (short message service) signaling between a mobile station operable in such a system and the corresponding network infrastructure thereof.

Digital communication techniques have also fostered the widespread use of networks, such as the Internet and local area networks. Large amounts of data, typically formatted into frames or packets, are communicated by way of such networks to effectuate communication of data between sending and receiving stations operable therein. By formatting the digital data into packets or frames, the data can be communicated at discrete intervals upon a communication channel by a sending station. Once received at a receiving station, the packets or frames of data are concatenated together to recreate the informational content of the digital bits of which the packets or frames are formed.

Cellular, and other, radio communication systems have been proposed, or are already implemented, which permit wireless network communication by way of a mobile station. Multi-media services, messaging services, distribution services, dispatching services, and retrieval services, such as pursuant to the World Wide Web (WWW) of the Internet are all possible for the use of such a mobile station. A protocol, referred to as the wireless application protocol (WAP) has been promulgated, and mobile stations operable pursuant to such protocol facilitate the efficient communication of data formatted for transmission by way of the Internet.

Additional, new services are possible by way of a mobile station. operable pursuant to the WAP. A large number of different type consumer transactions can be effectuated by way of such a mobile station.

Conventional, consumer transactions are effectuable remotely by way of telephonic, both wireline, and non-wireline, communications. Conventional voice prompting and DTMF (dual tone multi frequency) tonal generation is utilized to effectuate such conventional transactions remotely. Banking transactions, such as bill payment by phone, are commonplace.

Also, various online banking services, such as balance inquiries, viewing of personal loan installments, stock transactions, and bill payments are available to a customer. A customer equipped with a personal computer, connected to the Internet or to a PSTN (public-switched telephonic network) via a conventional telephone, wireline or otherwise, is able to partake of such online banking services. But, various problems sometimes interfere with the performance of such services. Computer configuration difficulties, unreliable Internet connections, and high equipment costs interfere with, or prevent customer use of, such services. Also, such services can sometimes be effectuated utilizing DTMF tone generation from a telephonic keypad. But DTMF tone generation typically requires user entry of long numerical sequences.

And, conventional transaction services are generally user-initiated. That is to say, a user effectuating a remote transaction telephonically must typically initiate the effectuation of the transaction service.

The conventional requirement that a user initiate the remote transaction service prevents the possibility of implementation of nonuser-initiated services.

If a manner will provide a means by which to permit automatic, nonuser effectuation of a transaction service remotely, additional services would be possible.

It is in light of this background information related to the performance of transaction services by way of a radio communication system that the significant improvements of the present invention have evolved.

SUMMARY OF THE INVENTION

The present invention, accordingly, advantageously provides apparatus, and an associated method, by which automatically to alert a user of a mobile station of the occurrence of a triggering event at a remote location. Notification to the user is made automatically, without need for the user to inquire of the transaction.

In one aspect of the present invention, apparatus is provided for a transaction service provider coupled to a network part of a communication system in which a mobile station is operable to communicate therethrough. During operation, upon the occurrence of a triggering event, a notification message is generated and automatically sent to the mobile station. A storage element stores indicia of one or more triggering events. Monitoring of operations of the transaction service provider is performed by a triggering event detector to detect the occurrence of any of the one or more triggering events stored at the storage element. When any of the triggering events is detected, a notification message is generated indicative of the occurrence, and the message is sent to the mobile station.

In another aspect of the present invention, apparatus is provided for a mobile station operable in a radio communication system. During operation, the mobile station is able to detect the notification message and to alert a user of the mobile station of the notification message sent thereto and identifying the occurrence of one or more triggering events. A detector is coupled to receive indications of reception at the mobile station of the notification message at the mobile station. An alerting transducer is operable responsive to detection by the message detector of reception of the notification message at the mobile station. The transducer generates an audio signal to alert the user of the mobile station of the occurrence of the triggering event. When a notification message is generated for more than one triggering event, a different audio signal is generated for each of the more than one triggering events, thereby to distinguish between the different triggering events.

In one implementation, notification is made to a user of a mobile station of a transaction of a banking service-related event, such as a debit or a credit, to an account associated with the user of the mobile station. When a credit is made to the user's account, a first notification message is generated. And, when a debit is made to the user's account, a second notification message is generated. Other triggering events can also be monitored and corresponding notification messages generated. The notification message is communicated to the mobile station over a mobile link, thereby to be received at the mobile station.

When the notification message is detected at the mobile station, an audio signal is generated to alert the user of the mobile station of the occurrence of the debit or credit to the user's account. Different audio signals are generated, depending upon whether the notification message indicates a debit or credit to the user's account.

In an exemplary implementation, the triggering events are selectable by the user of the mobile station by way of user actuation of an actuation keypad of the mobile station. A user of the mobile station selects which triggering events are to be stored at the transaction service provider device, and a message is generated indicative of such selection and transmitted to the transaction service provider device. Thereafter, indicia indicating the selection is stored at the storage device thereof. In another implementation, the triggering events are selected by the transaction service provider. And, in another implementation, the triggering events are mobile-station specific. That is, the triggering events are associated with the mobile station, such as pursuant to a service subscription, rather than user-specified.

The mobile station, in one implementation, is a WAP (wireless application protocol) phone operable in a GSM (global system for mobile communications) network which provides for SMS (short message service) messaging by way of a short message service center (SMSC). A transaction service provider server is coupled to an X.25 packet-switched network to which the SMSC is also coupled. When a triggering event is detected at the transaction server provider, a notification message is routed through the X.25 network to the short message service center. And, in turn, an SMS message is routed through network infrastructure of the GSM network and then over a radio link to the WAP phone. When detected at the WAP phone, an audio alert is generated to alert the user of the WAP phone of the occurrence of the triggering event.

Thereby, automatic notification is made to the user of the WAP phone of the occurrence of the triggering event at the transaction service provider without specific inquiry or initiation by the user of the WAP phone.

In these and other aspects, therefore, apparatus, and a corresponding method, is provided for a transaction service provider device operable in a radio communication system. The radio communication system has a radio part including a mobile station and radio network infrastructure and also a network part to which the transaction service provider device is coupled. A communication path is formable between the transaction service provider device and the mobile station. A notification message is automatically sent to the mobile station responsive to a triggering event. The triggering event storage element is provided for storing indicia identifying at least one triggering event. A triggering event detector is coupled to detect occurrences at the transaction service provider device of the at least one triggering event. A notification message generator is coupled to the triggering event detector. The notification message generator generates the notification message when the triggering event detector detects the occurrence of the at least one triggering event.

In these and other aspects, further apparatus, and an associated method, is provided for a mobile station operable in the radio communication system. The apparatus alerts a user of the mobile station of the notification message sent to the mobile station. A notification message detector is coupled to receive indications of reception of the notification message at the mobile station. An alerting transducer is coupled to the notification message detector. The alerting transducer generates an alert, in human perceptible form, responsive to detection by the notification message detector of the reception of the notification message at the mobile station.

A more complete description of the present invention and the scope thereof can be obtained from the accompanying drawings, which are briefly summarized below, the following detailed description of the presently-preferred of the embodiments of the invention, and the appended claims.

DETAILED DESCRIPTION OF THE PREFERRED EMBODIMENT

Figure 1:
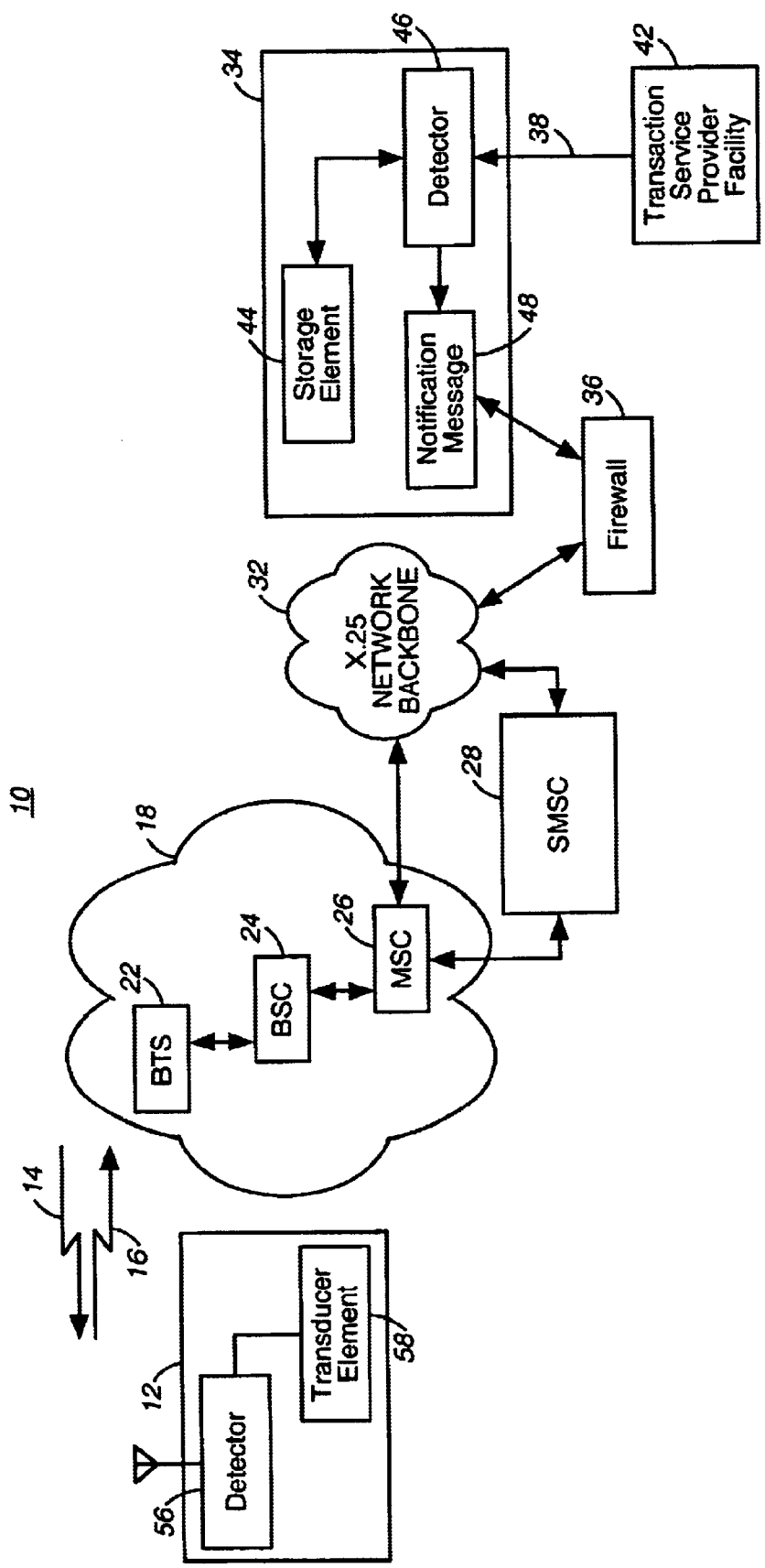
FIG. 1 illustrates a functional block diagram of a communication system in which an embodiment of the present invention is operable.

FIG. 1 illustrates a communication system, shown generally at 10, in which an embodiment of the present invention is operable. While the following description shall be described with respect to the exemplary system shown in the figure, it should be understood that such description is by way of example only. An embodiment of the present invention is similarly operable in other types of communication systems. Accordingly, operation of an embodiment of the present invention can analogously be described with respect to such other types of communication systems.

The communication system 10 provides for wireless communications with a mobile station 12 by way of a radio link, here including forward and reverse link channels 14 and 16, respectively. The mobile station 12 is here a WAP (wireless application protocol)-capable, cellular terminal operable in a GSM (global system for mobile communications) cellular communication system.

The mobile station 12 communicates by way of the radio link with the network infrastructure 18 of the GSM network. Here, the network infrastructure is shown to include a base transceiver station (BTS) 22, a base station controller (BSC) 24, and a mobile switching center (MSC) 26.

The GSM network permits the communication of SMS (short message service) messages and, accordingly, includes a Short Message Service Center (SMSC) 28. The Short Message Service Center 28 is coupled to structure of the GSM network 18, thereby to permit the communication of SMS messages with the mobile station 12.

The network infrastructure 18 and the mobile station 12 form the radio part of the communication system 10.

The communication system 10 is further shown to include a network. backbone, here in X.25 network backbone 32 which is coupled to the network infrastructure by way of appropriate gateway elements, not separately shown. The short message service center 28 is also coupled to the network backbone 32.

A transaction service provider server 34 is coupled to the network backbone, here by way of a firewall 36. The firewall 36 is conventional in nature, formed, for instance, of an authentication server device, or the like. And, the transaction service provider device is coupled to receive information on the line 38 provided by appropriate element located at a transaction service provider facility 42.

The server 34 is here shown to include a storage element 44 having memory locations for storing indicia of one or more triggering events. The server also includes a detector 46 which is capable of accessing the memory contents of the storage element. The detector is capable of detecting the occurrence of any of the triggering events stored at the storage element. Here, the detector is coupled, by way of the line 38, to receive indications of occurrence of events at the transaction service provider facility 42. When a triggering event is detected to have occurred, an indication of such detection is provided to a notice message generator 48. The notice message generator is operable to generate a notice message, to be communicated to the mobile station 12 to alert the mobile station of detection of the occurrence of the triggering event. Thereby, a user of the mobile station is automatically alerted of the occurrence of the triggering event.

In the system 10 shown in the figure, the message generated by generator 48 forms a short message which is routed to the short message service center 28 by way of the X.25 network 32. The message generated by the notification message generator includes information indicating which of the triggering events of which occurrence is detected by the detector 46 if more than one triggering event is stored at the storage element.

The short message service center, in turn, directs the short message through the network infrastructure 18 of the GSM network to be sent upon a forward link channel 14 to the mobile station 12.

The mobile station includes a message detector 56 coupled to transceiver circuitry (not separately shown in FIG. 1) for detecting reception at the mobile station of the notification message. And, the mobile station also includes a transducer element 58 operable to generate an audio signal when the detector 56 detects reception at the mobile station of the notification message. Thereby, the user of the mobile station is alerted to the occurrence of the triggering event.

In an exemplary implementation, the transaction service provider is a bank service provider at which a user of the mobile station maintains an account. Triggering events, of which indicia thereof is stored at the storage element 44, includes debits and credits to the account associated with the user of the mobile station. When an indication of a debit or credit to the account is provided by way of the line 38 to the server 34 and detected thereat by the detector 46, an indication of such detection is provided to the notification message generator 48. The generator generates a first short message when a debit to the account is detected, and the generator generates a second short message when a credit to the account is detected. Triggering events, as well as different gradations of credits and debits, can also form triggering events and corresponding messages can be generated upon detection of their occurrence by the detector 46.

Thereby, a manner is provided by which to monitor bank account transactions conveniently and automatically. Because of the radio link connection of the mobile station to the network infrastructure, a user of the mobile station is able to be alerted of a transaction to the user's account when positioned at any location encompassed by the GSM coverage area. In contrast to conventional systems, alerts are automatically provided to the user and the user is not limited to utilization of, e.g., a desktop personal computer or phone location. Initiation of requests by the user, such as by establishing an Internet connection to the transaction service provider server, is not required.

Figure 2:
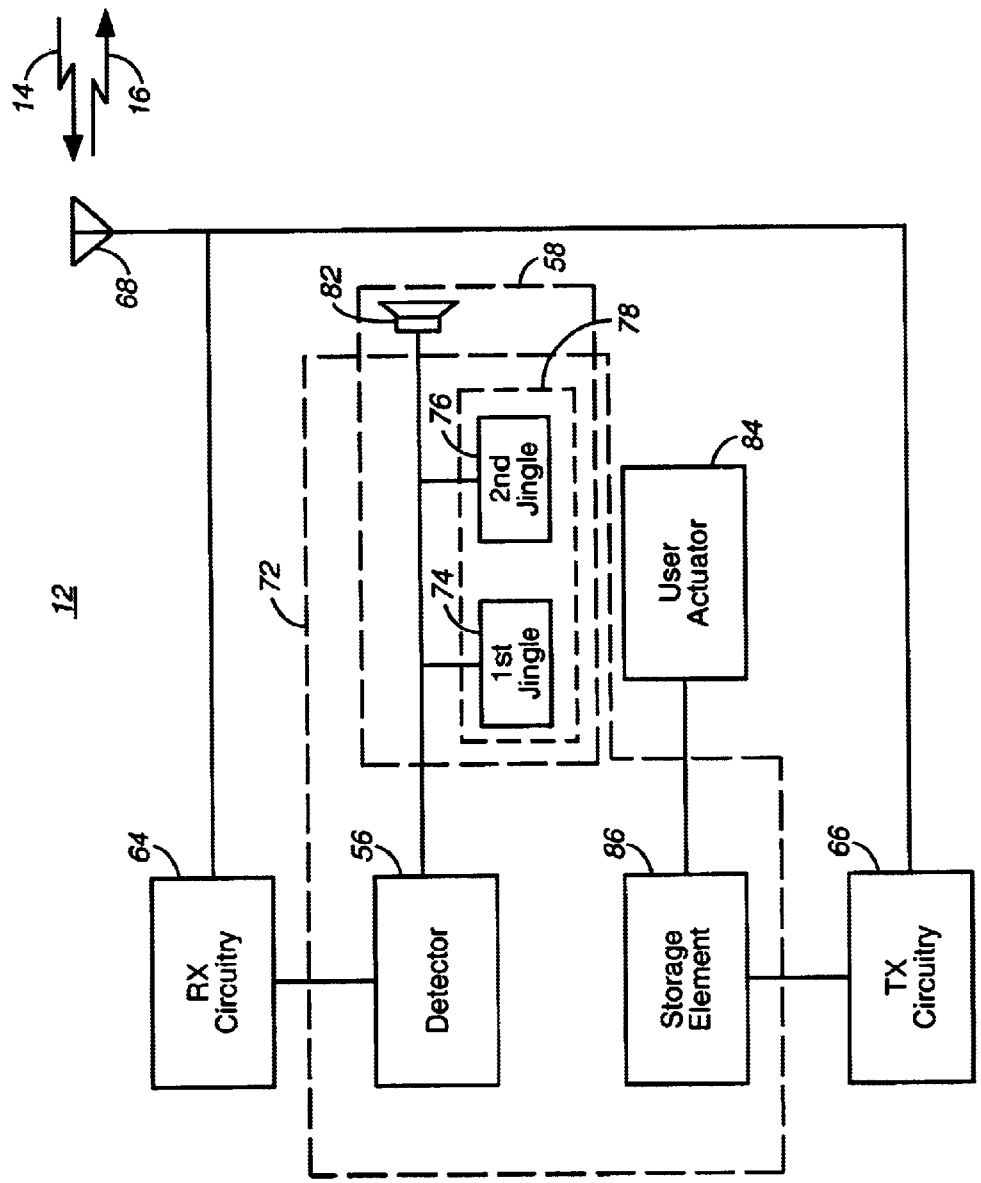
FIG. 2 illustrates a functional block diagram of a mobile station forming a portion of the communication system shown in FIG. 1.

FIG. 2 illustrates again the mobile station 12, shown in FIG. 1, to form a portion of the communication system 10. The mobile station, as noted above, is operable to transceive radio signals upon forward and reverse link channels 14 and 16, respectively.

Here, the mobile station is shown to include receive circuitry 64 and. transmit circuitry 66. In conventional manner, the receive circuitry is operable to receive signals generated upon forward link channels, once converted into electrical form by an antenna transducer 68, and the transmit circuitry 66 is operable in conventional manner to generate the electrical transmit signals which are converted into electromagnetic form by the antenna transducer to be transmitted upon a forward link channel 16.

The detector 56 and audio transducer element 58 are again shown to form portions of the mobile station. Here, the detector and a portion of the audio transducer element 58 form portions of a control element which also forms a portion of the mobile station. The detector 56 is coupled to the receive circuitry 64 to detect reception at the receive circuitry of a short message representing the notification message generated by the notification message generator 48 (shown in FIG. 1). Responsive to such detection, the detector causes an audio tune to be played by the transducer element 58. Here, melodic tunes 74 and 76 are stored at a storage element 78. A selected tune is retrieved responsive to which notification message is received by the detector. The tune is retrieved and caused to be played by the transducer element, here also shown to include a microphone 82.

The mobile station further includes a user actuator 84, such as a telephonic actuation keypad and other actuation keys, conventional of a mobile station. Appropriate actuation of the actuation keys of the actuator permit a user of the mobile station to select one or more triggering events, here indicia of which are stored at a storage element 86. The user of the indicia of the triggering event or events selected for actuation of the user actuator are provided to the transmit circuitry 66 to be sent by the mobile station upon a reverse link channel 16, thereafter to be routed through the network infrastructure 18 (shown in FIG. 1) to the short message service center 28 (also shown in FIG. 1), thereafter to be stored at the storage element 44 of the server 34 (all shown in FIG. 1). In other implementations, the triggering events are mandated by the mobile station, and in other implementations, the triggering events are selected by the transaction service provider.

In one implementation, the user of the mobile station selects which tune is to be played responsive to detection of a notification message. Selection can be made, for instance, to play the same tune upon detection of any of more than one notification message or to change a prior selection to alter which tune is played responsive to detection of a particular notification message.

Figure 3:
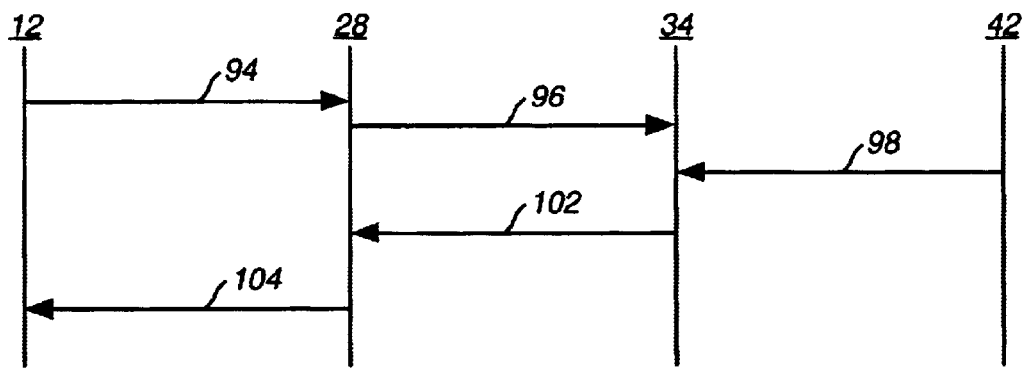
FIG. 3 illustrates a message sequence diagram showing signaling squencing during operation of an embodiment of the present invention.

FIG. 3 illustrates a message sequence diagram, shown generally at 92, showing the signaling between the mobile station 12, short message service center 28, and transaction service provider 34 during operation of an embodiment of the present invention.

Here, the triggering events responsive to which a notification message is generated by the transaction service provider server upon their detection are selected at the mobile station. Once selected at the mobile station, a short message, here indicated by the segment 94, is sent by the mobile station to the short message service center. The short message service center forwards on the short message, here indicated by the segment 96, to the transaction service provider server, and indicia of the selected triggering event or events is stored at the storage element thereof. An indication of an occurrence of a triggering event is provided by the transaction service provider facility to the transaction service provider server 34. Such indication is indicated here by the segment 98. Responsive thereto, the notification message generator of the transaction service provider server generates a short message, indicated by the segment 102, which is communicated to the short message service center. The short message service center forwards on a short message, here indicated by the segment 104, to the mobile station. When detected at the mobile station, an audio tune is caused to be played to alert a user of the mobile station of the occurrence of the triggering event.

Figure 4:
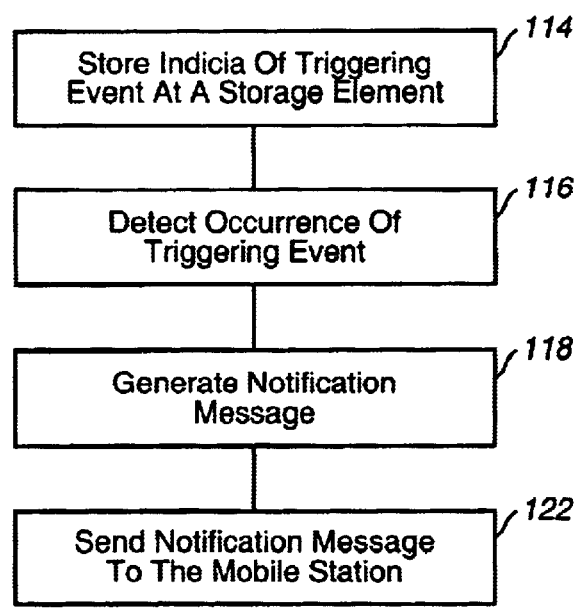
FIG. 4 illustrates a method flow diagram listing the method of operation of an embodiment of the present invention.

FIG. 4 illustrates a method flow diagram, shown generally at 112, listing the method steps of the method of operation of an embodiment of the present invention. The method 112 automatically sends a notification message to a mobile station responsive to a triggering event occurring at a remote location.

First, and as indicated by the block 114, indicia identifying at least one triggering element is stored at a transaction service provider device. Then, and as indicated by the block 116, the occurrence of the at least one triggering event is detected.

Responsive thereto, and as indicated by the block 118, a notification message is generated. And, as indicated by the block 122, the notification message is sent upon a communication path to be communicated to the mobile station.

Thereby, through operation of an embodiment of the present invention, a user of the mobile station is automatically alerted of the occurrence of a selected triggering event at the transaction service provider device. When implemented at a bank service provider, a user of the mobile station is able to automatically be notified of a debit or credit to the user's bank account. Notification is made automatically, without need for the user to make inquiry to the transaction service provider device.

The previous descriptions are of preferred examples for implementing the invention, and the scope of the invention should not necessarily be limited by this description. The scope of the present invention is defined by the following claims:

I claim:

1. In a radio communication system having a radio part including a mobile station and radio network infrastructure and having a network part to which a transaction service provider device is coupled, a communication path formable between the transaction service provider device and the mobile station, an improvement of apparatus for automatically sending a notification message to the mobile station responsive to a triggering event and for alerting a user of the mobile station of the triggering event, said apparatus comprising:

a triggering event storage element positioned at the transaction service provider, said triggering event storage element for storing indicia identifying at least one triggering event formed of a first triggering event and at least a second triggering event;

a triggering event detector coupled to detect occurrences at the transaction service provider device of the at least one triggering event;

a notification message generator coupled to said triggering event detector, said notification message generator for generating a first notification message when said triggering event detector detects the occurrence of the first triggering event and for generating at least a second notification message when said triggering event detector detects the at least the second triggering event;

a notification message detector coupled to receive indications of reception of the first notification message and the at least the second notification message at the mobile station; and an alerting transducer coupled to said notification message detector, said alerting transducer for generating a first audible alert, responsive to detection by said notification message detector of the reception of the first notification message at the mobile station and for generating at least a second audible alert responsive to detection of the reception of the at least the second notification message.

2. The apparatus of claim 1 wherein the transaction service provider device comprises a transaction service provider computer server, wherein the network part of the radio communication system comprises a hatchet-switched network, wherein the radio communication system further comprises a SMS (short message service) center, and wherein the notification message generated by said notification message generator comprises a SMS notification message, the communication path between the transaction service provider computer server and the mobile station including the SMS center.

3. The apparatus of claim 2 wherein the indicia identifying the at least on triggering event is selected at the mobile station and a SMS triggering-event message, generated at the mobile station, and communicated to the transaction service provider computer servicer contains the indicia identifying the at least one triggering event to be stored thereat.

4. The apparatus of claim 1 wherein the transaction service provider device comprises a banking service provider device and wherein the at least one triggering event comprises at least one banking service-related event.

5. The apparatus of claim 4 wherein the banking service provider device is associated with a banking service provider, wherein the banking service provider provides services related to an account associated with a user of the mobile station and wherein the at least one banking service-related event forming the at least one triggering event comprises at least one account-related event pertaining to the account associated with the user.

6. The apparatus of claim 5 wherein the account-related event comprises a credit to the account associated with the user.

7. The apparatus of claim 5 wherein the account-related event comprises a debit to the account associated with the user.

8. The apparatus of claim 5 wherein said triggering event detector detects occurrence of the at least one account-related event.

9. The apparatus of claim 1 wherein the indicia identifying the at least one triggering event is selected at the mobile station and a triggering-event message containing the indicia identifying the at least one triggering event is forwarded, by way of the communication path, to the transaction service provider device to be stored thereat.

10. The apparatus of claim 9 wherein the mobile station includes a user actuator, actuable by a user, and wherein the at least one triggering event, selected at the mobile station, is selected by user actuation of the user actuator.

11. The apparatus of claim 9 wherein the mobile station has associated therewith operational presets and wherein the indicia identifying the at least one triggering event is selected from the operational presets associated with the mobile station.

12. In a method for communicating in a radio communication system having a radio part including a mobile station and radio network infrastructure and having a network part to which a transaction service provider device is coupled, a communication path formable between the transaction service provider device and the mobile station, an improvement of a method for automatically sending a notification message to the mobile station responsive to a triggering event, and for alerting a user of the mobile station of the triggering event, said method comprising:

storing, at the transaction service provider device, indicia identifying at least one triggering event formed of a first triggering event and at least a second triggering event;

detecting occurrence of any of the first triggering event and at least a second triggering event;

generating a first notification message responsive to detection during said operation of detecting of the first triggering event and at least a second notification message responsive to detection during said operation of detecting of the at least the second triggering event;

sending any of the first notification message and the at least the second notification message, generated during said operation of generating responsive to detection, respectively, of any of the first triggering event and the at least the second triggering event, upon the communication path;

detecting, at the mobile station, the any one of the first notification message and the at least the second notification message sent during said operation of sending; and generating a first audio alert at the mobile station to notify a user of the mobile station of the occurrence of the first triggering event responsive to detection of the first notification message and at least a second audible alert responsive to detection of the at least the second notification message.

13. The method of claim 12 wherein the transaction service provider device comprises a banking service provider device and wherein the at least one triggering event stored during said operation of storing comprises at least one banking service-related event.

14. The method of claim 12 wherein the banking service provider device is associated with a banking service provider, wherein the banking service provider provides services related to an account associated with a user of the mobile station and wherein the at least one banking service-related event stored during said operation of storing comprises storing at least one account-related event pertaining to the account associated with the user.

* * * * *